(12) United States Patent
Saito

(10) Patent No.: US 7,535,792 B2
(45) Date of Patent: May 19, 2009

(54) DATA TRANSMISSION CONTROL DEVICE, AND DATA TRANSMISSION CONTROL METHOD

(75) Inventor: Takeshi Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/874,641

(22) Filed: Oct. 18, 2007

(65) Prior Publication Data

US 2008/0106961 A1 May 8, 2008

(30) Foreign Application Priority Data

Nov. 7, 2006 (JP) ............................. 2006-301051

(51) Int. Cl.
*G11C 8/18* (2006.01)
(52) U.S. Cl. .............................. 365/233.19; 365/233.1; 365/238.5
(58) Field of Classification Search .............. 365/233.1, 365/233.13, 233.16, 233.17, 189.14, 191, 365/195, 233.19, 238.5
See application file for complete search history.

(56) References Cited

U.S. PATENT DOCUMENTS

| | | | | |
|---|---|---|---|---|
| 5,949,736 | A * | 9/1999 | Sugita | 365/230.06 |
| 6,728,157 | B2 * | 4/2004 | Yagishita et al. | 365/222 |
| 7,254,690 | B2 * | 8/2007 | Rao | 711/169 |
| 2008/0010429 | A1 * | 1/2008 | Rao | 711/169 |

FOREIGN PATENT DOCUMENTS

| | | |
|---|---|---|
| JP | 9-288614 A | 11/1997 |
| JP | 2002-63069 A | 2/2002 |

* cited by examiner

*Primary Examiner*—Tuan T Nguyen
*Assistant Examiner*—Hien N Nguyen
(74) *Attorney, Agent, or Firm*—Sughrue Mion, PLLC

(57) ABSTRACT

A data transmission control device includes: a memory control unit that is connected to a DRAM, and accesses to the DRAM in accordance with a read/write request from various devices that request read/write of data from/into the DRAM; and a command control unit that issues an active command of designating a row address of the DRAM to start a memory access cycle when the read/write request is made, and issues a precharge command to the DRAM to end the memory access cycle, and that prohibits issuance of a precharge command in a previous memory cycle if the issuance of the precharge command is unnecessary. The command control unit determines that the issuance of the precharge command is unnecessary if another read/write request from/into the same page as a page requested in a memory access cycle is made, and determines that the issuance of the precharge command is necessary if another read/write request from/into a page different from a page requested in a memory access cycle is made, or no read/write request is repeated with a predetermined number of times, which are equal to or greater than two, as an upper limit.

4 Claims, 6 Drawing Sheets

DATA TRANSMISSION CONTROL DEVICE, AND DATA TRANSMISSION CONTROL METHOD

BACKGROUND

1. Technical Field

The present invention relates to a data transmission control device, and particularly, to a technique that improves the efficiency of data transmission.

2. Related Art

Conventionally, a CPU (Central Processing Unit) included in a printer controller that controls a printer utilizes a DRAM (Dynamic Random Access Memory), etc. as a main memory. The CPU and the DRAM perform data transmission mutually via a memory control ASIC (Application Specific Integrated Circuit).

The memory control ASIC controls data transmission between a printing engine and the DRAM, or data transmission between various devices, such as a personal computer (hereinafter referred to as "PC"), and the DRAM.

Generally, the control in the data transmission with the DRAM of the memory control ASIC is performed according to a sequence including (bank) active processing, read/write processing, and precharge processing. Here, the (bank) active processing is the processing that the memory control ASIC designates a row address on the DRAM. The read/write processing is the processing that the memory control ASIC makes a storage element having the address designated by active processing execute predetermined processing including read processing and write processing. The precharge processing is the processing that the memory control ASIC holds the data of the storage element that has undergone the read/writing processing.

Further, the precharge processing is performed after lapse of several clock periods from the read/write processing in consideration of execution time of read/write processing.

In the method of controlling data transmission according to the sequence as described above, if the memory control ASIC gets continuous access to the DRAM, the same sequence is repeated. Accordingly, even if the memory control ASIC gets continuous access to the same page of the DRAM, the processing that has no problem even if not executed, such as precharge processing or active processing after read/write processing.

Thus, a technique of suppressing execution of the processing that has no problem even if not executed when the memory control ASIC gets continuous access to the same page of the DRAM has been developed. For example, in the related art, the memory control ASIC determines whether the access to the same page is continuous when it accesses to the DRAM, and does not executes the processing that has no problem even if not executed. In the following, the event that the memory control ASIC gets continuous access to the same page of the DRAM is called "page hit."

However, there is a problem with the relates art in that the probability of page hit is low because the above determination period is fixed to one clock period of a system clock.

SUMMARY

An advantage of some aspects of the invention is to provide a technique that can raise the probability of page hit in the control of data transmission between a memory control ASIC and the DRAM. In the exemplary aspect of the present invention, the determination of page hit to be performed when a memory control ASIC accesses to a DRAM is performed during a period from issuance of a command of instructing read/write processing to issuance of a command of instructing precharge processing.

Specifically, a data transmission control device provided with the memory control ASIC includes: a memory control unit that is connected to a DRAM, and accesses to the DRAM in accordance with a read/write request from various devices that request read/write of data from/into the DRAM; and a command control unit that issues an active command of designating a row address of the DRAM to start a memory access cycle when the read/write request is made, and issues a precharge command to the DRAM to end the memory access cycle, and that prohibits issuance of a precharge command in a previous memory cycle if the issuance of the precharge command is unnecessary. Here, the command control unit determines that the issuance of the precharge command is unnecessary if another read/write request from/into the same page as a page requested in a memory access cycle is made, and determines that the issuance of the precharge command is necessary if another read/write request from/into a page different from a page requested in a memory access cycle is made, no read/write request is repeated with a predetermined number of times, which are equal to or greater than two, as an upper limit.

In addition, exemplary embodiments of the invention will be described below. The configurations mentioned below have the degrees of freedom in possible combinations. All the combinations will constitute the invention. That is, aspects in which some constitutional elements are properly eliminated from an embodiment to be described below can also be other embodiments of the invention. Further, all the constitutional elements that are specifically shown below are just lower conceptual elements among upper conceptual elements that are considered to are the same in function.

According to the data transmission control device of the aspect of the invention, the probability of page hit in the control of data transmission between the memory control ASIC and the DRAM can be raised.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings.

Figure 1:
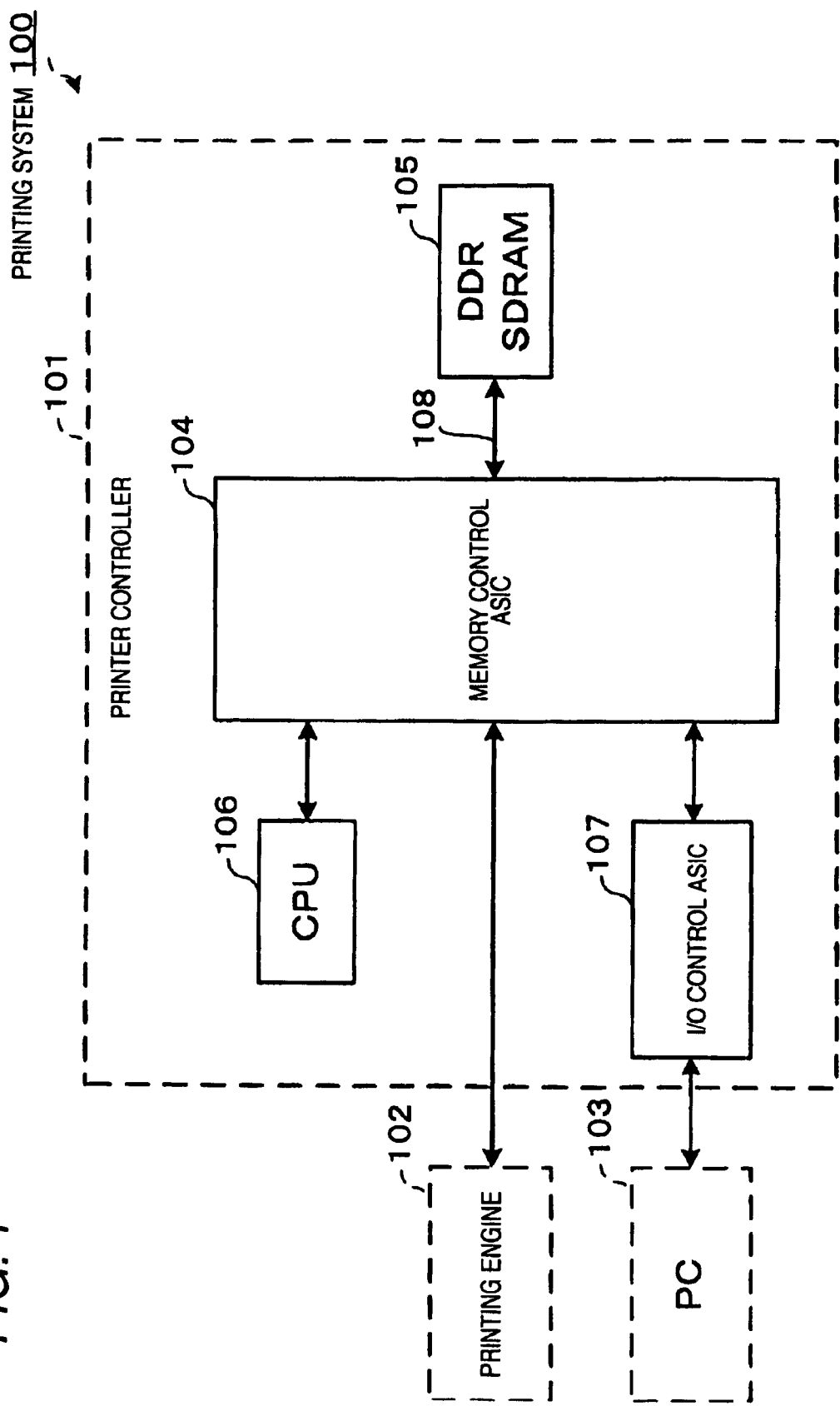
FIG. 1 is a block diagram showing a hardware configuration of a data transmission control device.

A printing system 100 applied to the exemplary embodiment of the invention, as shown in FIG. 1, includes a controller 101 that controls the printing system 100, a printing engine 102 that executes printing processing, and a PC 103.

The controller 101 includes a memory control ASIC 104, a DDR_SDRAM 105, a CPU 106, and an I/O control ASIC 107.

The memory control ASIC 104 is a circuit that controls data transmission between the CPU 106, the printing engine 102, or the PC 103, and the DDR_SDRAM 105. When the memory control ASIC 104 has received a request of access to the DDR_SDRAM 105 from the printing engine 102 or the PC 103, it makes the DDR_SDRAM 105 executes the above-described (bank) active processing, read/write processing, and precharge processing according to the request. In addition, the (bank) active processing, read/write processing, and precharge processing based on the request to the DDR_SDRAM 105 is referred to as "memory access cycle." This memory access cycle is started by the (bank) active processing. Further, the memory access cycle is ended by executing the precharge processing.

When the read/write processing is executed, the memory control ASIC 104 determines whether or not there is any page hit. The memory control ASIC 104 performs the determination of this page hit during a period until a command of ordering precharge processing is issued from a point of time when a command of ordering read/write processing is issued to a point of time.

Thereby, the printing system 100 in the exemplary embodiment is able to raise the probability of the page hit.

Further, if the memory control ASIC 104 has determined that there is any page hit, it does not execute the subsequent precharge processing, and (bank) active processing. The memory control ASIC 104 makes a memory element of an address on the DDR_SDRAM 105 designated in the next read/write processing execute the next read/write processing. Thereby, the printing system 100 in the exemplary embodiment is able to improve the efficient of data transmission between the memory control ASIC 104 and the DDR_SDRAM 105.

Figure 2:
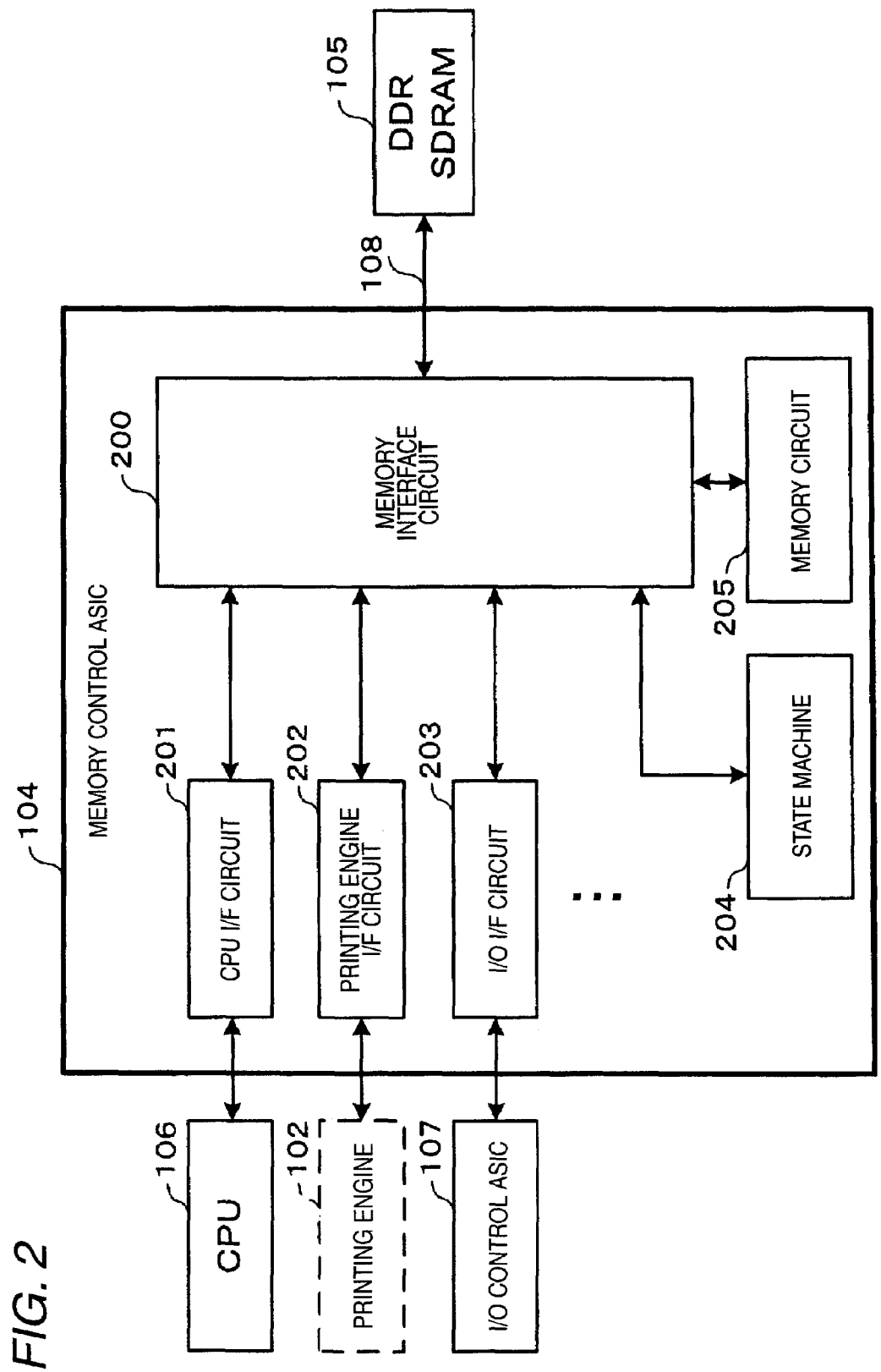
FIG. 2 is a block diagram showing a hardware configuration inside a memory control ASIC.

The inside of the memory control ASIC 104, as showing in FIG. 2, is constituted with a memory interface circuit 200, a CPU interface (I/F) circuit 201, a printing engine interface (I/F) circuit 202, an I/O interface (I/F) circuit 203, a state machine 204, a memory circuit 205, and the like.

The memory interface circuit 200 controls the data transmission between each device the DDR_SDRAM 105 via the CPU interface circuit 201, the printing engine interface circuit 202, and the I/O interface circuit 203. The data transmission between the memory interface circuit 200 and the DDR_SDRAM 105 is performed via an external bus 108.

The CPU interface circuit 201, the printing engine interface circuit 202, and the I/O interface circuit 203 controls the data transmission between the memory control ASIC 104 and each device (CPU 105, printing engine 102, or PC103).

The state machine 204 is connected to the memory interface circuit 200. The state machine 204 is a device that makes a transition of a plurality of predetermined states in a definite order on the basis of a signal from the memory interface circuit 200. When transition from a certain state to another state has been made, the state machine 204 supplies a signal indicating the state of a transition destination to the memory interface circuit 200, thereby controlling the memory interface circuit 200.

In addition, the present invention may not include the memory interface circuit 200, but may control the state of the memory interface circuit 200 by means of software.

The memory circuit 205 is connected to the memory interface circuit 200. When the memory interface circuit 200 has received a request of access to the DDR_SDRAM 105 from each device, an address on the DDR_SDRAM 105 to which access is requested is stored. This address includes a row address and a column address, indicating a page. The memory circuit 205 is referred to when the memory interface circuit 200 performs page hit determination.

Referring back to FIG. 1, the DDR_SDRAM 105 is a DRAM that is designed so as to operate in synchronization with an external clock. The DDR_SDRAM 105 is controlled by the memory control ASIC 104. For example, the memory control ASIC 104 is able to designate the row address on the DDR_SDRAM 105 to perform writing/reading of data into/from a specific page. The DDR_SDRAM 105 includes a plurality of banks, and is able to control each of the banks independently. Further, the clock speed of the DDR_SDRAM 105 may be 66 MHz, 100 MHz, 133 MHz, or the like.

The CPU 106 controls the whole printing system 100. The CPU 106 makes the DDR_SDRAM 105 perform processing, such as reading or writing of data, via the memory control ASIC 104.

The I/O control ASIC 107 is a circuit that converts a signal supplied from the PC 103 into a signal that can be processed by the memory control ASIC 104. In the exemplary embodiment, an instrument to be connected to the I/O control ASIC 107 is limited to the PC 103. However, the invention is not limited thereto. For example, an instrument to be connected to the I/O control ASIC 107 may be a digital camera, a PDA, etc.

The printing engine 102 is made up of a toner cartridge, a laser-light radiating mechanism, a sheet feed mechanism, a sheet ejection mechanism that performs feed and ejection processing of a print medium, etc. Further, the printing engine 102 is controlled as the CPU 106 executes a printing command included in the printing data transmitted from the PC 103. Specifically, the printing engine 102, for example, is able to print the image data transmitted via the memory control ASIC 104 from the DDR_SDRAM 105.

The PC 103 may be a personal computer that generally comes into wide use.

Figure 3:
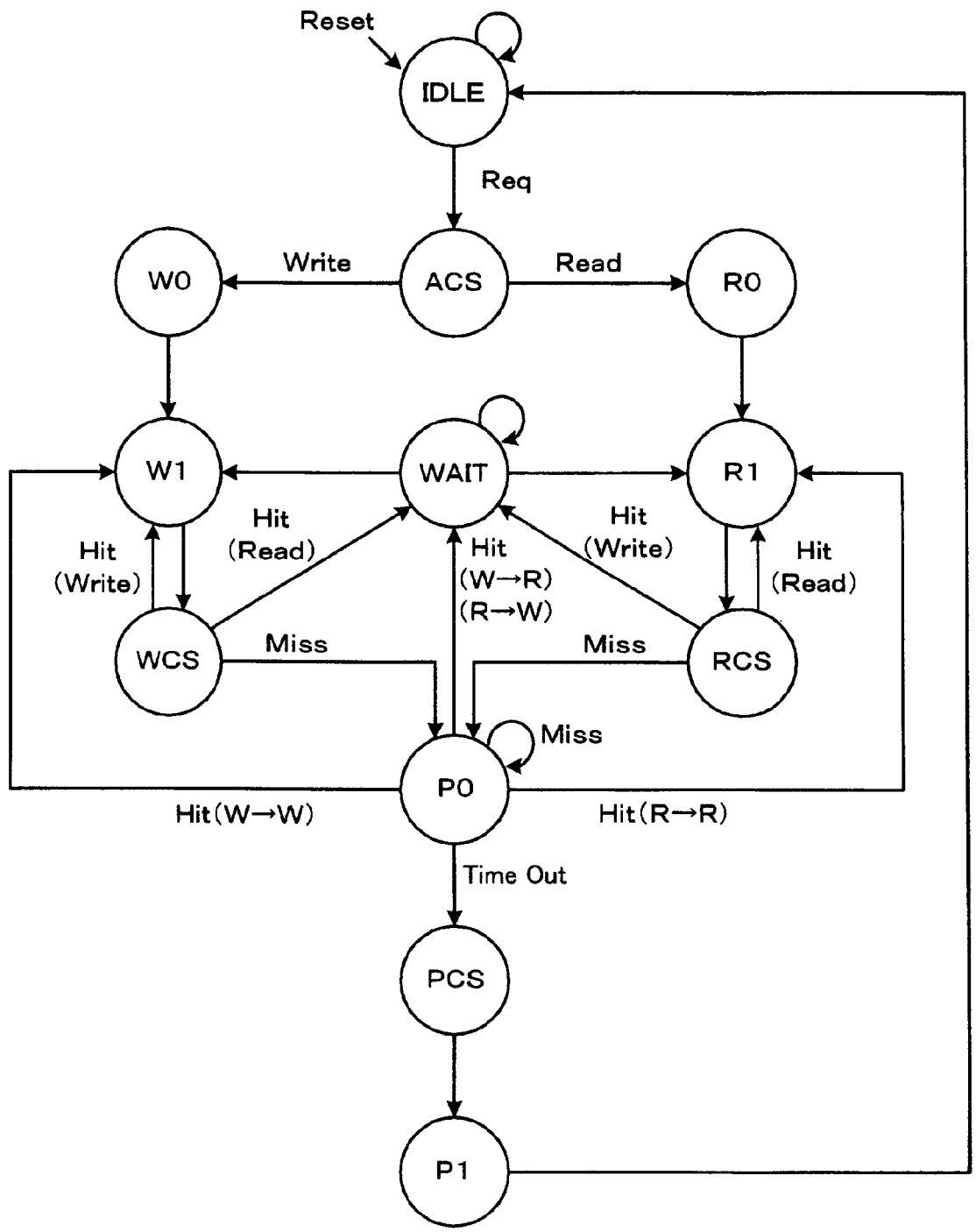
FIG. 3 is a state transition diagram for allowing a page hit to be determined.

Next, the specific operation when the memory control ASIC 104 in the printing system 100 having a configuration as described above performs determination of page hit will be described with reference to a state transition diagram shown in FIG. 3. In addition, the state shown in this state transits diagram transits according to the state of the state machine 204.

The memory interface circuit 200 inside the memory control ASIC 104 changes the present state into an IDLE state, thereby starting the operation of controlling the DDR_SDRAM 105, when the controller 101 is supplied with power, or when the controller 101 is reset. In the IDLE state, the memory interface circuit 200 waits for a request from each device via the CPU interface circuit 201, the printing engine interface circuit 202, and the I/O interface (I/F) circuit 203. Specifically, the memory interface circuit 200 makes a clock signal from the outside (CPU 106, printing engine 102, or PC103) effective. In addition, if the clock signal from the outside is effective, a system clock in the memory interface circuit 200 operates.

In the IDLE state, the memory interface circuit 200 changes the present state to an ACS state, thereby issuing a command of instructing the DDR_SDRAM 105 to perform (bank) active processing, via the external bus 108 when it has received a request from each device. Specifically, the memory interface circuit 200 generates a signal of requesting access to the DDR_SDRAM 105 from each device, as an OR signal (MEM_REQX). For reference, the waveform of the signal (MEM_REQX) generated at this time is shown in FIG. 4.

Figure 4:
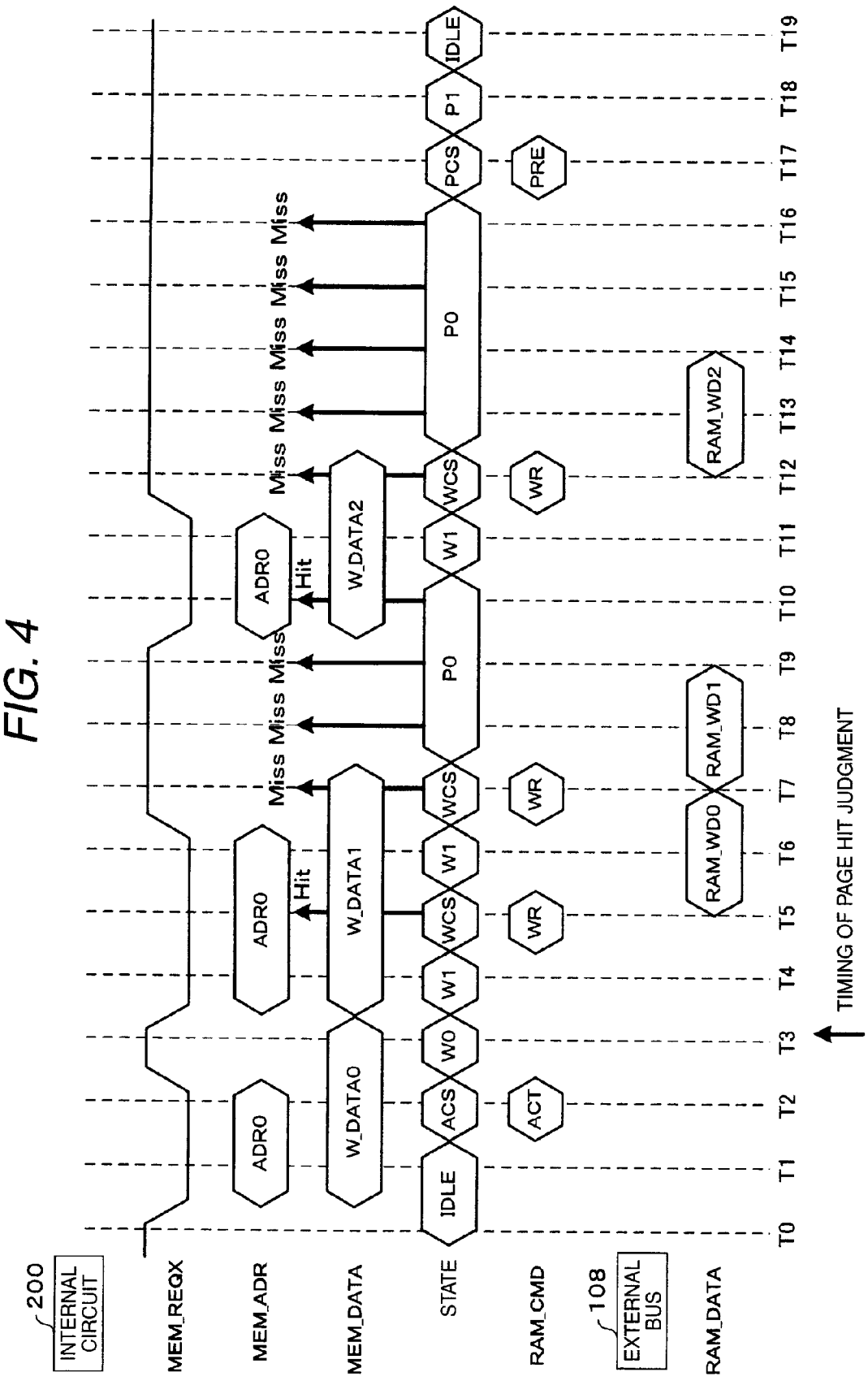
FIG. 4 is a view showing an example of a waveform of a control signal generated by the memory control ASIC.

Here, dot lines (T0 to T19) shown in FIG. 4 indicate rising points of time of a system clock. As shown in FIG. 4, the MEM_REQX is switched to "Low" from "High" (T0→T1) when a signal of requesting access to the DDR_SDRAM 105 is supplied from any one of individual devices. Accompanying with this switching, transition from the IDLE state to the ACS state is made (T2). From each device, along with the signal of requesting access to the DDR_SDRAM 105, a row address (MEM_ADR) that designates a page in the DDR_SDRAM 105 that requests access is supplied. Along with this, if writing of data into the DDR_SDRAM 105 is requested, the data to be written into the DDR_SDRAM 105 is also supplied. At this time, the memory interface circuit 200 stores the supplied MEM_ADR in the memory circuit 205. For reference, the waveforms of the MEM_ADR and MEM_DATA are shown in FIG. 4. In FIG. 4, the supplied MEM_ADR is shown as ADR0, and the supplied MEM_DATA is shown W_DATA0. The memory interface circuit 200 issues a command (ACT), which designates an address corresponding to the MEM_ADR, to the DDR_SDRAM 105 via the external bus 108. For reference, the waveform of a command (ACT) to be issued is shown in FIG. 4 (T2).

Referring back to FIG. 3, the memory interface circuit 200 also supplies a signal showing write/read to the DDR_SDRAM 105 when received a request from each device. On the basis of this signal, the memory interface circuit 200 determines whether a request from each device is a read or write signal. If the memory interface circuit 200 has determined that the request is a write signal, it shifts the present state transit to a W1 state or a WCS state. On the other hand, if the memory interface circuit has determined that the request is a read signal, it shifts the present state transit to an R1 state or RCS state. For reference, in FIG. 4, the transition of a state when the memory interface circuit 200 has determined that the request is a write signal is shown (W0 state (T3), W1 state (T4), and WCS state T5)).

Here, the W0 state and W1 state are preparation states where the present state is shifted to the RCS state. Similarly, the R0 state and R1 state are preparation states where the present state is shifted to the RCS state.

Referring back to FIG. 3, in the WCS state, and the W1 state, the memory interface circuit 200 issues a command of instructing read/write processing to the DDR_SDRAM 105. However, the memory interface circuit 200 issues a write command in the WCS state, and issues a read command in the RCS state. For reference, the waveform of a command (WR) to be issued is shown in FIG. 4 (T5). Further, if a write command is issued, the memory interface circuit 200 writes MEM_DATA onto a page on the DDR_SDRAM 105 designated by (bank) access processing, via the external bus 108. For reference, the waveform of data (RAM_DATA) to be written in the DDR_SDRAM 105 is shown in FIG. 4. In FIG. 4, the data to be written in the DDR_SDRAM 105 is shown as RAM_WD0.

Referring back to FIG. 3, if the present state is an WCS state or RCS state, after a command of instructing read/write processing is issued to the DDR_SDRAM 105, the memory interface circuit 200 determines whether or not a request at this point of time from each device (at a point of time of T5 in the example of FIG. 4) is page-hit (refer to a thick arrow at a point of time of T5 in FIG. 4). Specifically, the memory interface circuit 200 first generates a signal of requesting access to the DDR_SDRAM 105 from each device as an OR signal (MEM_REQX). Subsequently, the memory interface circuit 200 determines whether or not there is any request from each device depending on whether the generated MEM_REQX is a high or low signal. If there is any request from each device, the memory interface circuit 200 determines whether or not the row address (ADR0 shown by a range of T4 through T6 in the example of FIG. 4) supplied along with the request from each device coincides with a previously supplied row address (ADR0 shown by a range of T1 through T2 in the example of FIG. 4). Here, the previously supplied row address is stored in the memory circuit 205. If the above row addresses coincide with each other, a page will be hit. In the example of the FIG. 4, since both the row addresses coincide with each other in ADR0, a page will be hit.

Referring back to FIG. 3, if the present state is the WCS state or RCS state, the memory interface circuit 200 then determines whether a request from each device is a write or read signal on the basis of a signal supplied along with the request from each device.

Here, if the present state is the WCS state, and if a received request is page-hit, and it has been determined that a signal supplied along with this request is a write signal, the state of the memory interface circuit 200 transits to the WCS state (T7). On the other hand, if it has been determined that the request is a read signal, the state of the memory interface circuit 200 transits to a WAIT state, R1 state, or WCS state.

Here, the WAIT state is a preparation state where the present state is shifted to a W1 state or R1 state.

Further, if the present state is the RCS state, and if a received request is page-hit, and it has been determined that a signal supplied along with this request is a read signal, the state of the memory interface circuit 200 transits to the R1 state or RCS state. On the other hand, if it has been determined that the request is a write signal, the state of the memory interface circuit 200 transits to the WAIT state, R1 state, or WCS state.

On the other hand, if the present state is the WCS state or RCS state, and if there is no request from each device, and it has been determined that a received request is not page-hit, it is determined there is a page miss, and then the state of the memory interface circuit 200 transits to a P0 state. Here, the P0 state is a wait state until a command of instructing precharge processing is issued.

Referring to the above state transition in the example of FIG. 4, a received request is page-hit in the WCS state at a point of time of T5, it is determined that a signal supplied along with this request is a write signal, and then the present state transits to a W1 state (T6) or WCS state (T7). Since there is no request from each device in the WCS state at a point of time of T7 (refer to a thick arrow at the point of time of T7), it is determined that there is any page miss, and thus present state transits to a P0 state (T8).

Referring back to FIG. 3, if the present state is a P0 state, the memory interface circuit 200 performs the determination whether or not a request from each device is page-hit, similarly to the WCS state/RCS state. If the present state is a P0 state, and if the request is page-hit, the present state transits to a state similar to that when it has been determined that the request is page-hit in the WCS state/RCS state.

On the other hand, if the present state is a P0 state, and if it is determined that there is a page miss, the present state is kept at the P0 state. In the example of P4, in the P0 state at a point of time of T8 and T9, there is no request from each device (refer to a thick arrow). Therefore, it is determined that there is a page miss, and the P0 state is kept during T8 through T10.

Referring back to FIG. 3, if there is no page hit even when the P0 state is kept during four clock periods of a system clock, an event that the present state transits to a PCS state is described in advance in the state machine 204.

However, if the memory interface circuit 200 has determined that a request received from each device is page-hit while the P0 state is kept during four clock periods, the present state does not transit to a PCS state, but transits to a W1 state or R1 state, on the basis of a signal supplied along with a received request. In the state of FIG. 4, after the P0 state is kept during three clock periods from T8 to T10, a request received from each device is page-hit (refer to a thick arrow at a point of time of T10). Therefore, the present state transits to a W1 state (T11).

Accordingly, after page hit, the memory interface circuit 200 does not perform issuance (PRE) of a command of precharge processing corresponding to a request at a point of time of T7 or issuance (ACT) of a command of (bank) active processing corresponding to a request at a point of time of T10, but issues a command of read/write processing corresponding to the request at a point of time of T10 (T12).

Further, during four clock periods from T13 to T16, there is no single page hit (refer to thick arrows at points of time of T13 to T16). Therefore, at a point of time of T17, the present state transits to a PCS state.

Referring back to FIG. 3, in the PCS state, the memory interface circuit 200 issues a command of instructing precharge processing to the DDR_SDRAM 105. Specifically, the memory interface circuit 200 temporarily stores the data of the DDR_SDRAM 105 where read/write is made by read/write processing, in other pages. Here, a page where data can be stored temporarily may be a page of a different bank.

Further, for reference, the waveform of a command (PRE) to be issued is shown in FIG. 4 (T17).

Referring back to FIG. 3, the state of the memory interface circuit 200 transits to a P1 state after the PCS state. The P1 state is a wait stat of precharge processing. The state of the memory interface circuit 200 transits to an IDLE state after one clock. In the example of FIG. 4, the present state transits from the PCS state (T17) to the P1 state (T18) and the IDLE state (T19)

The above description is specific description of the memory control ASIC 104 when determination of page hit is performed.

Figure 5:
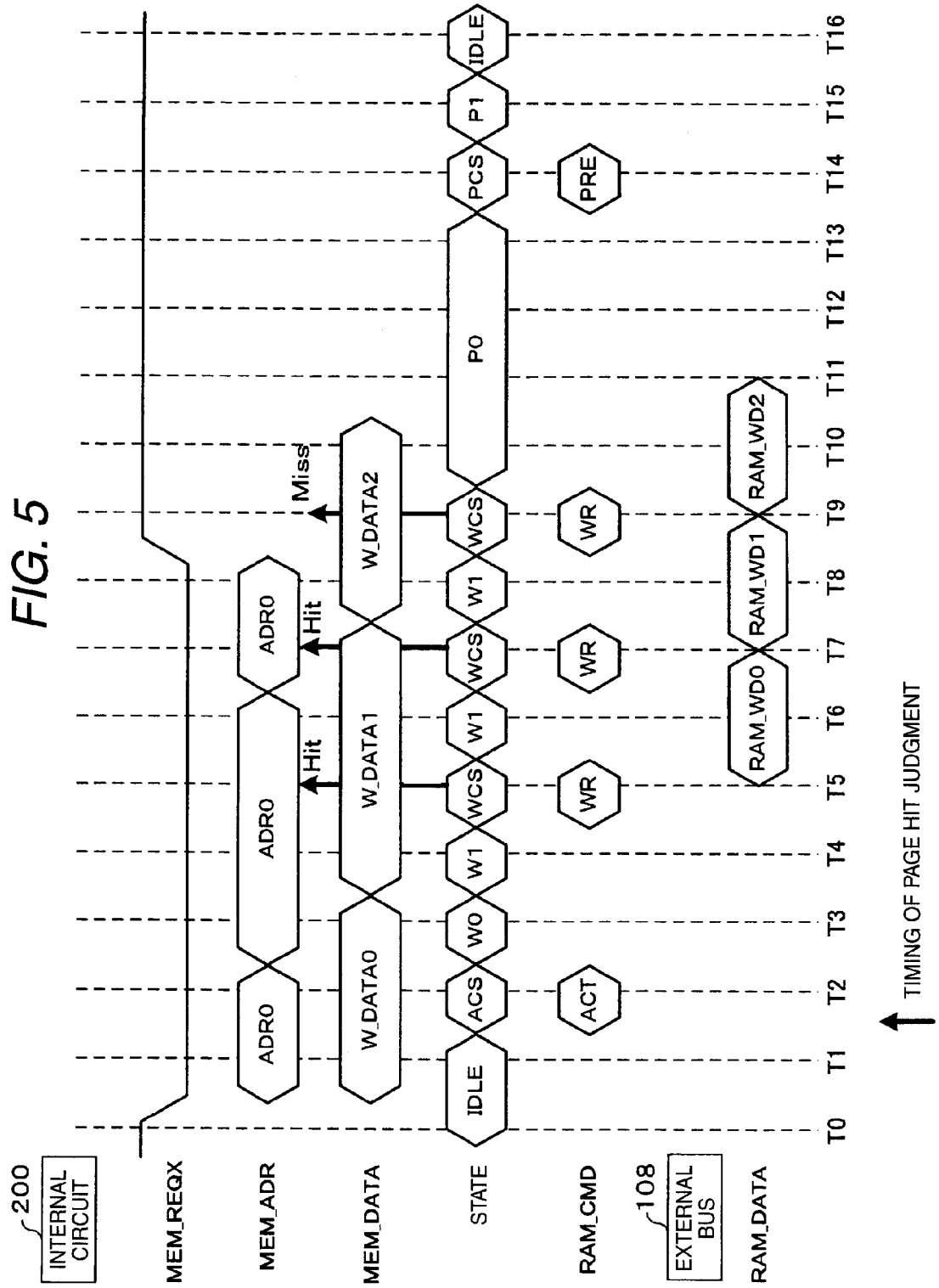
FIG. 5 is a view showing an example of a waveform of a control signal generated by a conventional memory control ASIC.

Next, for comparison with the determination of page hit of the exemplary embodiment, the determination of page hit in the related art will be described with reference to FIGS. 5 and 6. FIG. 5 is a view illustrating the determination of page hit in a case where a request from each device is continuous temporally.

As described above, the determination period of page hit in the related art is fixed to one clock period of a system clock. That is, the determination of page hit in the related art is performed only when the present state is a WCS state. For example, in FIG. 5, determination of page hit is performed at points of time of T5, T7, and T9. In FIG. 6, determination of page hit is performed at points of time of T5, T7, and T18.

As shown in FIG. 5, if a memory interface circuit in the related art temporally continuously receives a request from each device during a period from T1 to T8, the probability of page hit is high.

Specifically, in determination of page hit at a point of time of T5, the memory interface circuit 200 determines that there is any page hit, because a page (ADR0) requested at a point of time T5 coincides with a page (ADR0) requested during a period from T1 to T2. If it is determined that there is any page hit, the memory interface circuit does not perform issuance of a command of precharge processing corresponding to a request at a point of time of T1 or issuance of a command of (bank) active processing corresponding to a request at a point of T5, but issues (T7) a command of read/write processing corresponding to the request at a point of time of T5.

Even in the determination of page at a point of time of T7, the memory interface circuit 200 determines that this is a page hit because a page (ADR0) requested at a point of time T7 coincides with a page (ADR0) requested during a period from T3 to T6.

Figure 6:
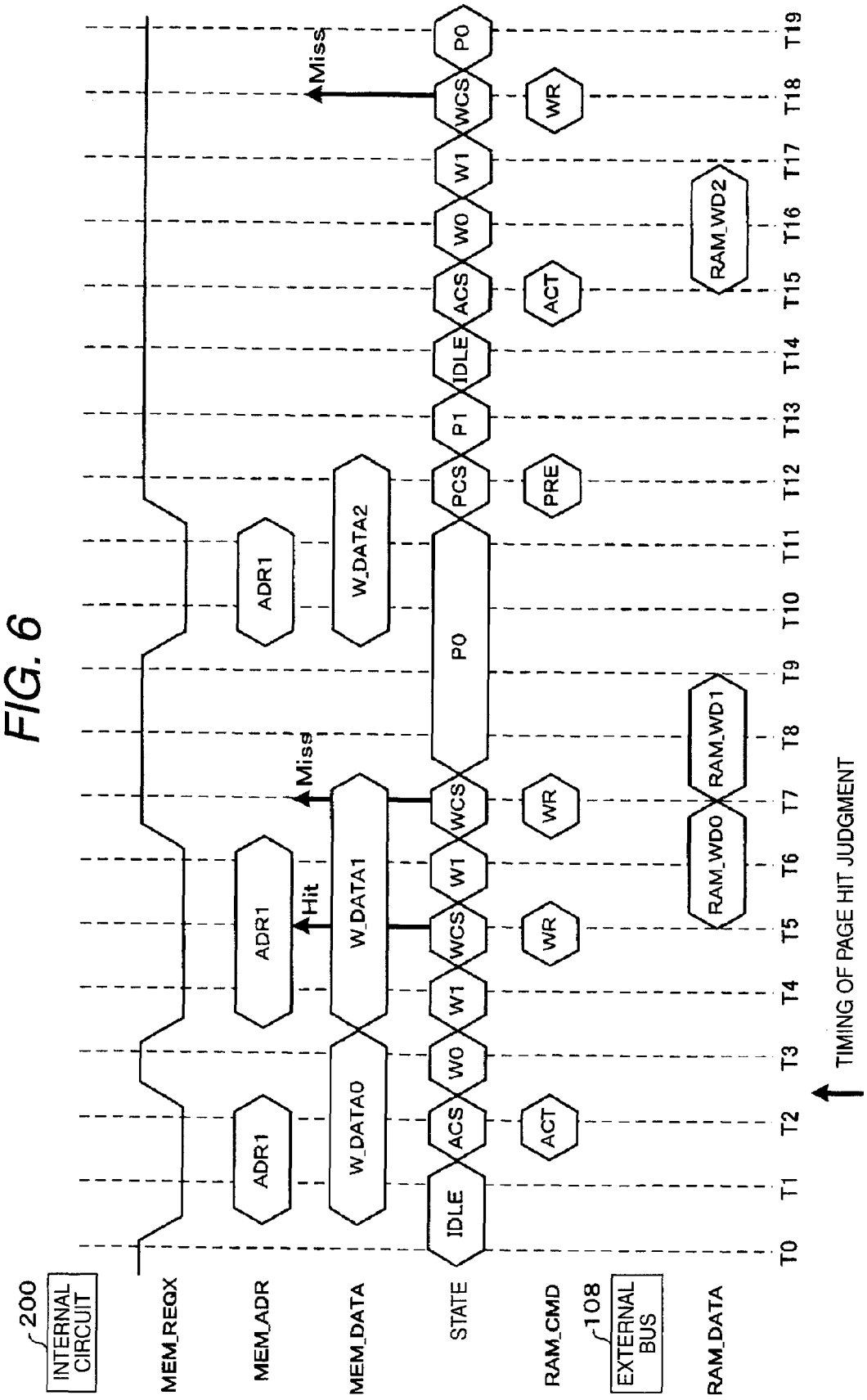
FIG. 6 is a view showing an example of a waveform of a control signal generated by a conventional memory control ASIC.

However, as shown in FIG. 6, if the memory interface circuit in the related art temporally continuously receives a request from each device, the probability of page hit becomes low.

Specifically, the memory interface circuit receives a request from each device during a period from T1 to T2, a period from T4 to T6, and a period from T10 to T11. In determination of page hit at a point of time of T5, the memory interface circuit determines that there is any page hit, because a page (ADR1) requested at a point of time T5 coincides with a page (ADR1) requested during a period from T1 to T2. If it is determined that there is any page hit, the memory interface circuit does not perform issuance of a command of precharge processing corresponding to a request at a point of time of T1 or issuance of a command of (bank) active processing corresponding to a request at a point of time of T5, but issues (T7) a command of read/write processing corresponding to the request at a point of time of T5.

However, in the determination of page hit at a point of time T7, the memory interface circuit determines that there is any page miss because it does not receive a request from each device. Although it has been described earlier, the determination of page hit in the related art is performed only during one clock period of T7. Therefore, irrespective of the fact that a page (ADR1) that coincides with a page (ADR1) requested during a period from T5 to T6 is requested during a period from T10 to T11 after T7, it is not possible to perform determination of page hit during a period from T10 to T11.

On the other hand, since the memory control ASIC 104 of the exemplary embodiment performs determination of page hit during four clock periods to a maximum as described above, the probability of page hit is high even in a case where a request from each device is not temporally continuous.

In addition, the invention can be applied in various ways, without being limited to the exemplary embodiment.

For example, in the above exemplary embodiment, determination of page hit is performed during four clock periods of a system clock. However, the invention is not limited thereto. For example, determination of page may be performed during six clock periods or eight clock periods.

Further, in the above exemplary embodiment, only the CPU 106, the printing engine 102, and the PC 103b are described as various devices that perform data transmission with the DDR_SDRAM 105. The invention is not limited thereto. For example, the various devices may be a digital camera, a PDA, etc., or may be a PC, etc. that is connected via a network.

Furthermore, in the above exemplary embodiment, the DDR_SDRAM 105 is described as a memory that to be controlled by the memory control ASIC 104. However, the invention is not limited thereto. Any arbitrary memories, such as DRAM, that require precharge processing after data writing may be adopted. Specifically, for example, SDRAM, DDR2_SDRAM, DDR3_SDRAM, etc. may be adopted.

Further, in the above exemplary embodiment, precharge processing is performed even after data has been written in the DDR_SDRAM 105 or even after data has been read from the DDR_SDRAM 105. However, the invention is not limited thereto. The precharge processing may not be performed even after data has been written in the DDR_SDRAM 105.

This application claims priority from Japanese Patent Application No. 2006-301051 filed on Nov. 7, 2006, the entire disclosure of which is expressly incorporated by reference herein.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the sprit and scope of the invention.

What is claimed is:

1. A data transmission control device comprising:
   a memory control unit that is connected to a DRAM, and accesses to the DRAM in accordance with a read/write request from various devices that request read/write of data from/into the DRAM; and
   a command control unit that issues an active command of designating a row address of the DRAM to start a memory access cycle when the read/write request is made, and issues a precharge command to the DRAM to end the memory access cycle, and that prohibits issuance of a precharge command in a previous memory cycle if the issuance of the precharge command is unnecessary,
   wherein the command control unit
   determines that the issuance of the precharge command is unnecessary if another read/write request from/into the same page as a page requested in a memory access cycle is made, and
   determines that the issuance of the precharge command is necessary if another read/write request from/into a page different from a page requested in a memory access cycle is made, or no read/write request is repeated with a predetermined number of times, which are equal to or greater than two, as an upper limit.

2. The data transmission control device according to claim 1,
   wherein the predetermined number of times is equivalent to four clock periods of a system clock.

3. The data transmission control device according to claim 1,
   wherein the various devices includes a CPU that controls the data transmission control device, a printing engine that prints image data stored in the DRAM, and an information processing unit capable of performing transmission/reception of data with the data transmission control device.

4. A data transmission control method in a data transmission control device including:
   a memory control unit that is connected to a DRAM, and accesses to the DRAM in accordance with a read/write request from various devices that request read/write of data from/into the DRAM; and
   a command control unit that issues an active command of designating a row address of the DRAM to start a memory access cycle when the read/write request is made, and issues a precharge command to the DRAM to end the memory access cycle, and that prohibits issuance of a precharge command in a previous memory cycle if the issuance of the precharge command is unnecessary,
   wherein in the data transmission control method, the command control unit
   determines that the issuance of the precharge command is unnecessary if another read/write request from/into the same page as a page requested in a memory access cycle is made, and
   determines that the issuance of the precharge command is necessary if another read/write request from/into a page different from a page requested in a memory access cycle is made, or no read/write request is repeated with a predetermined number of times, which are equal to or greater than two, as an upper limit.

* * * * *